(12) United States Patent
Xu et al.

(10) Patent No.: US 7,551,795 B2
(45) Date of Patent: Jun. 23, 2009

(54) METHOD AND SYSTEM FOR QUANTIZATION ARTIFACT REMOVAL USING SUPER PRECISION

(75) Inventors: Ning Xu, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 498 days.

(21) Appl. No.: 11/264,973

(22) Filed: Nov. 1, 2005

(65) Prior Publication Data

US 2007/0098294 A1  May 3, 2007

(51) Int. Cl.
*G06K 9/40* (2006.01)
(52) U.S. Cl. .................................. 382/264; 382/275
(58) Field of Classification Search .......... 382/254–275
See application file for complete search history.

(56) References Cited

U.S. PATENT DOCUMENTS

| 5,802,218 | A * | 9/1998 | Brailean | 382/275 |
| 6,668,097 | B1 * | 12/2003 | Hu et al. | 382/275 |
| 6,724,942 | B1 * | 4/2004 | Arai | 382/254 |
| 6,862,372 | B2 * | 3/2005 | Yang et al. | 382/254 |
| 7,203,234 | B1 * | 4/2007 | Zeng | 375/240.03 |
| 2002/0164084 | A1 * | 11/2002 | Baggs | 382/275 |
| 2003/0053708 | A1 * | 3/2003 | Kryukov et al. | 382/261 |
| 2003/0179945 | A1 * | 9/2003 | Akahori | 382/260 |
| 2004/0001234 | A1 * | 1/2004 | Curry et al. | 358/3.08 |
| 2006/0104535 | A1 * | 5/2006 | Varekamp | 382/260 |
| 2007/0098294 | A1 * | 5/2007 | Xu et al. | 382/264 |

OTHER PUBLICATIONS

U.S. Appl. No. 11/106,812, filed Apr. 14, 2005, N. Xu et al.
R. W. Floyd and L. Steinberg, *An adaptive algorithm for spatial grey scale*, in Proc. Soc. Inf. Display, 1976, pp. 75-77, vol. 17, No. 2.
R. Ulichney, *Dithering with blue noise*, in Proceedings of IEEE, Jan. 1988, pp. 56-79, vol. 76, No. 1.

* cited by examiner

*Primary Examiner*—Jingge Wu
*Assistant Examiner*—Max Shikhman
(74) *Attorney, Agent, or Firm*—Kenneth L. Sherman, Esq.; Michael Zarrabian, Esq.; Myers Andras Sherman LLP

(57) ABSTRACT

An image processing method and system removes quantization artifacts in digital video/images. The local neighborhood of the current pixel is segmented based on a pre-defined quantization level to generate a segment containing the current pixel. Then, the luminance values of the pixels within the segment are low-pass filtered. Several sub-gains are computed based on measurements of the segment, and the sub-gains are multiplied together and filtered to obtain a final gain value. The final gain value is used to linearly interpolate between the original luminance value and the filtered luminance value of the pixel to obtain an output luminance value.

21 Claims, 7 Drawing Sheets

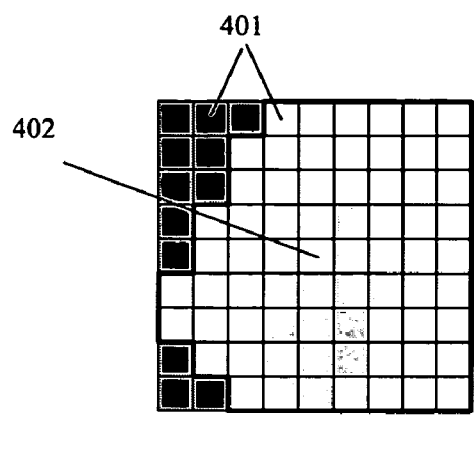 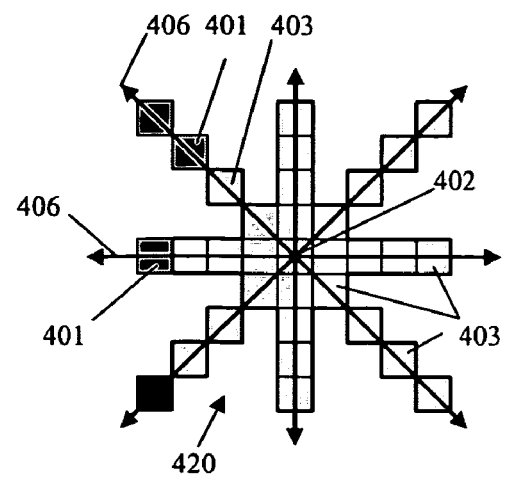
Fig. 4A
Fig. 4B

METHOD AND SYSTEM FOR QUANTIZATION ARTIFACT REMOVAL USING SUPER PRECISION

FIELD OF THE INVENTION

The present invention relates generally to video and image processing and in particular to removing quantization artifacts in video signals.

BACKGROUND OF THE INVENTION

A natural scene usually contains some smoothly changing areas where the luminance is changing gradually. When the scene is recorded by a digital device such as a video camera, because of digitization (i.e., quantization of the luminance value for each pixel in an area), the digitalized picture of the smoothly changing area may include quantization artifacts, whereby the area no longer appears smooth. Instead, quantization artifacts, such as stage-like false contours, may be perceived. The magnitude of quantization artifacts is determined by the quantization accuracy in an A/D converter of the digitization device. This magnitude is not necessarily the same as the smallest step of the digitization devices, in fact, it is usually much larger and makes the quantization artifacts more obvious to human vision systems.

To eliminate this type of quantization artifacts, first their location in the digital image is determined, and then smoothing is applied in such areas so that they appear smoothly changing. In general, the quantization artifacts look like steps within a large slowly changing region, but identifying them in a natural image is a difficult because it is required to distinguish whether they are caused by the quantization of smoothly changing areas or it is exactly the scene. In addition, the process becomes more complicated due to the presence of additive noise introduced by the digitization device. The presence of noise makes the areas containing quantization artifacts look like small detailed regions. If a noisy area is detected as an area containing quantization artifact, the smoothing process removes the noise as well as quantization layers.

Sometimes a smoothly changing area includes stage-like artifacts even when the luminance of the neighboring pixels is only changing by the smallest possible step. In this case, a higher precision content of the smoothly changing area is desired in order to eliminate the quantization artifacts. With the higher precision content, halftoning techniques can be used (e.g. error diffusion or spatial dithering), to quantize the higher precision content to the current bit depth. The quantization artifacts will no longer be seen on the halftoned image due to the spatial averaging characteristics of human visual system.

BRIEF SUMMARY OF THE INVENTION

The present invention provides a method and system for quantization artifact removal. In embodiment, such a method for quantization artifact removal in a digital image of pixels includes, generally, applying a segmentation method to obtain the local support pixels for each selected pixel which are within a same smoothly changing area, and then low-pass filtering the selected pixel to obtain a higher precision value based on the values of the local support pixels. A directional segmentation method is utilized which checks the luminance of pixels on eight different directions starting from the center pixel (i.e., the selected pixel). Further, several measurements are used to derive a gain value. The gain value is then used to adjust the resulting pixel luminance value after low-pass filtering, to obtain an output luminance value which has a precision higher than the input luminance value.

An image processing system according to an embodiment of the present invention removes quantization artifacts in digital video/images. The image processing unit comprises a segmentation unit, a filter, a gain computation unit and an adjustment unit. The local neighborhood of the current pixel is segmented by the segmentation unit based on a pre-defined quantization level to generate a segment containing the current pixel. Then, the filter applies low-pass filtering to the luminance values of the pixels within the segment. The gain computation unit computes several sub-gains based on measurements of the segment, and the sub-gains are multiplied together and filtered to obtain a final gain value. The adjusting unit uses the final gain value to linearly interpolate between the original luminance value and the filtered luminance value of the pixel to obtain an output luminance value.

These and other embodiments, features and advantages of the present invention will be apparent from the following specification taken in conjunction with the following drawings.

BRIEF DESCRIPTION OF THE DRAWINGS

FIGS. 4A-B show example segmentation results according to embodiments of the present invention.

DETAILED DESCRIPTION OF THE INVENTION

Figure 1:
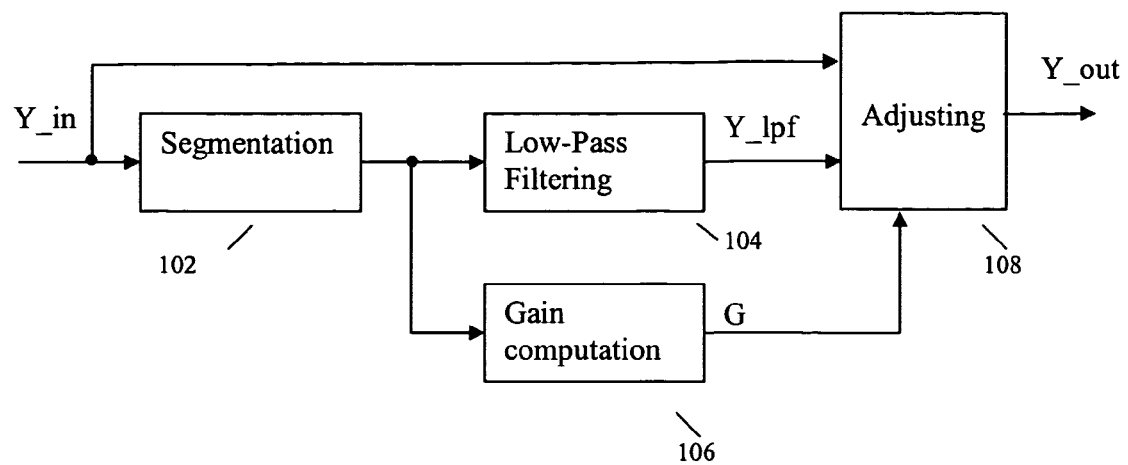
FIG. 1 shows an example functional block diagram of an embodiment of an image processing unit for removing quantization artifacts in a digital image, according to an embodiment of the present invention.

The present invention provides a method and system for quantization artifact removal. In embodiment, such a method for quantization artifact removal in a digital image of pixels includes, generally, applying a segmentation method to obtain the local support pixels for each selected pixel which are within a same smoothly changing area, and then low-pass filtering the selected pixel to obtain a higher precision value based on the values of the local support pixels. A directional segmentation method is utilized which checks the luminance of pixels on eight different directions starting from the center pixel (i.e., the selected pixel). Further, several measurements are used to derive a gain value. The gain value is then used to adjust the resulting pixel luminance value after low-pass filtering, to obtain an output luminance value which has a precision higher than the input luminance value. Such a method according to an embodiment of the present invention is termed super precision herein.

Referring to the functional block diagram in FIG. 1, an example implementation of a super precision system 100, implemented as super precision method according to an embodiment of the present invention, is described below. According to the system 100, the local neighborhood of the input pixel is first segmented and a low-pass filter is applied on the resulting segment. A gain computation block computes a gain value also based on the segmentation result. The computed gain value is used later in an adjusting block to obtain the output luminance Y_out value from the input luminance value Y_in and computed luminance after low-pass filter.

The system 100 includes a segmentation unit 102, a low-pass filtering unit 104, a gain computation unit 106 and an adjusting unit 108. The segmentation unit 102 applies a segmentation scheme to obtain the local support pixels for each selected pixel having a luminance value Y_in, wherein the local support pixels are within a same smoothly changing area. Then, the low-pass filtering unit 104 applies low-pass filtering to the selected pixel value to obtain a higher precision value based on the values of the local support pixels. The gain computation unit 106 uses several measurements to derive a gain value, wherein the gain value is used by the adjustment unit 108 to adjust the resulting pixel luminance value after low-pass filtering (i.e., output of the low-pass filtering unit 104), to obtain an output luminance value Y_out which has a precision higher than the input luminance value Y_in.

Figure 2:
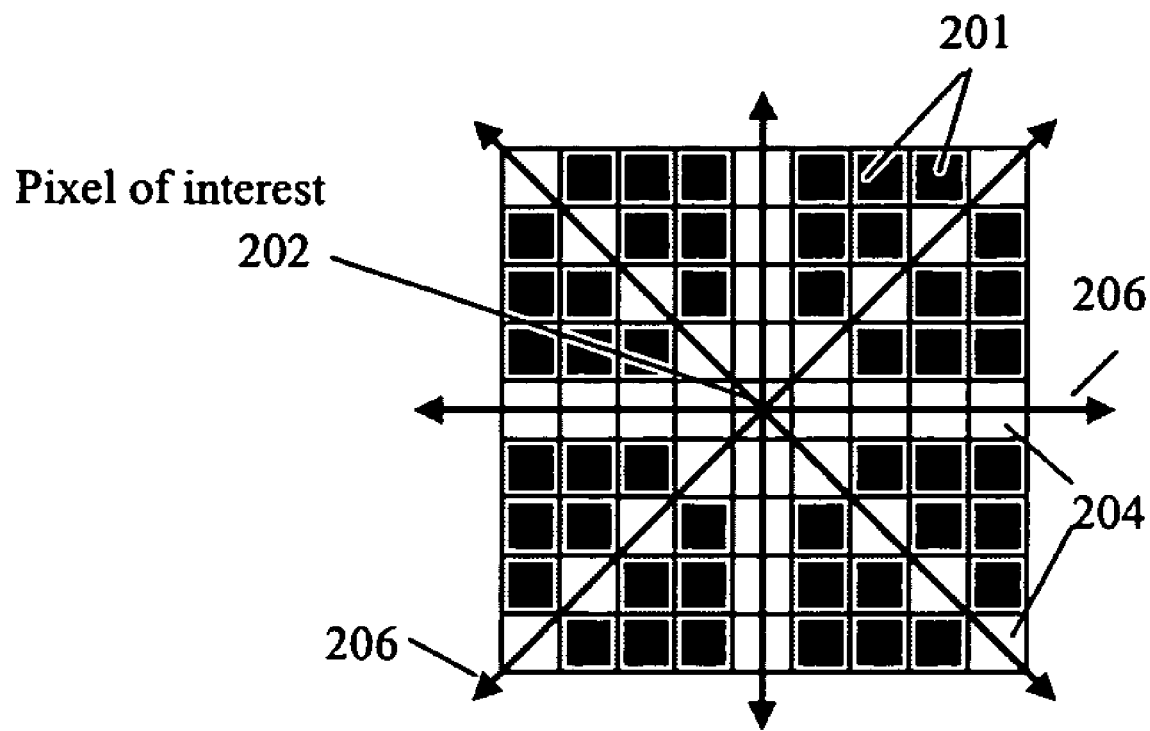
FIG. 2 shows diagrammatical example segmentation wherein pixels in a local square window checked in eight directions, according to an embodiment of the present invention.

FIG. 2 shows an example square window 200 of pixels 201, wherein the window 200 has a vertical size VSize and a horizontal size HSize (e.g., VSize=9 and HSize=9). FIG. 2 diagramatically illustrates an example directional segmentation method utilized in the segmentation unit 102 (FIG. 1) which, for a selected pixel of interest 202, checks the luminance of pixels 204 in eight different directions 206 (doubled headed arrows) starting from the center pixel (i.e., the selected pixel 202). In a discreet point of view, each pixel 202 is considered as lying within a smoothly changing area. The difference between different pixels 202 is that how large a smoothly changing area each pixel 202 belongs to. In a high-frequency area containing small details, a pixel 202 might belong to a smoothly changing area which contains only the pixel itself. In a large smoothly changing area where the quantization artifacts are located, a pixel 202 might belong to a large smoothly changing area containing many neighboring pixels of pixel 202.

Therefore, for each pixel 202 in the input image, a local neighborhood of support pixels is selected, wherein the neighborhood is large enough to smooth away possible quantization artifacts. Then, this local neighborhood is segmented into two parts, wherein one part contains the pixel of interest 202. The segment containing the pixel of interest 202 is expected to be within a smoothly changing area so that higher precision information can be obtained for the pixel of interest 202 based on the pixel values in this segment.

Before the segmentation process is applied, the above-mentioned local neighborhood of pixels is defined. In the example shown in FIG. 2, a rectangular window centered at the pixel of interest with size vertical size (VSize) and horizontal size (HSize). Both VSize and HSize are odd numbers so that the local neighborhood pixels will be centered at the pixel of interest. Thereafter, it is assumed that local neighboring pixels are in a smoothly changing image area with their luminance difference smaller than a predefined threshold termed quantization level (QL). The segmentation process is then carried out based on this quantization level. If the jump between two neighboring pixels is smaller than the quantization level QL, then the two neighboring pixels are considered to belong to the same segment. Since the segment that contains the center pixel is of interest, only pixels that are within the local neighborhood pixels and belong to the same segment as the center pixel are segmented out.

In one example operation, the directional segmentation process begins from the center pixel and outwards to its neighboring pixels in each of eight different directions separately, such as shown in FIG. 2. Along each direction, the pixels in that direction are examined one by one, wherein for each examined pixel the luminance value of the pixel under the examination and that of its neighboring pixel are compared to determine whether the difference value between these two pixels is larger than the quantization level QL (the luminance of the two neighboring pixels are compared, the difference is then compared with QL). If yes, the segmentation process in this direction will stop and the pixels before this point will be included in the resulting segment. After finishing the segmenting processes in all eight directions, a resulting segment is obtained which contains the center pixel.

Figure 3:
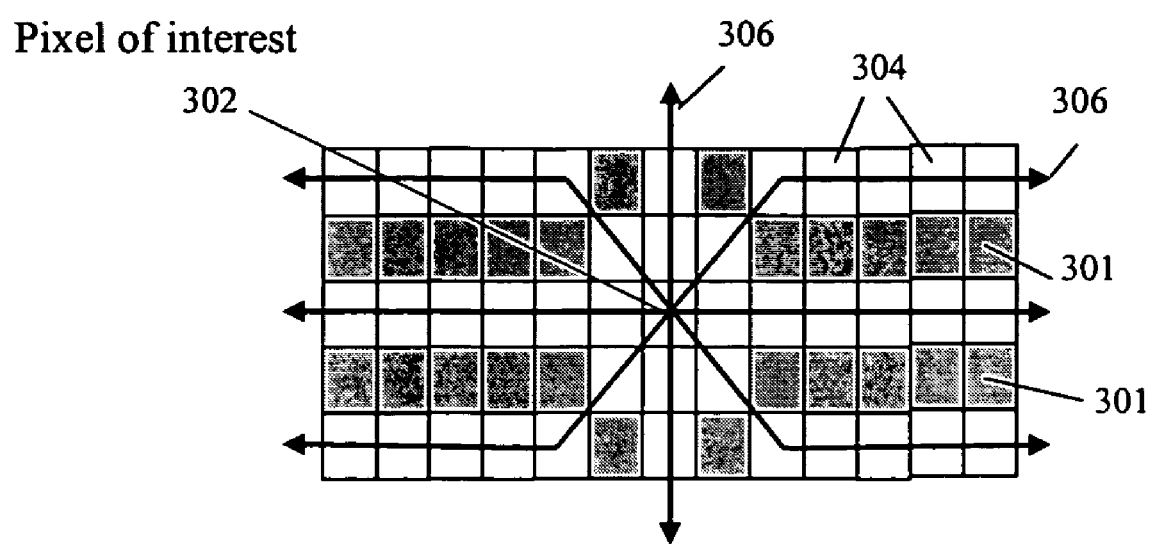
FIG. 3 shows another diagrammatical example segmentation wherein pixels in a local rectangular window are checked in eight directions, according to an embodiment of the present invention.

The example window 200 in FIG. 2 is a typical neighborhood window, which is a square window containing a pixel of interest 202. In the window 200, eight-directional segmentation is shown wherein only the pixels 204 (bordered and shown in a different shade than pixels 201) are checked along the eight directions 206. Generally, a large window size is preferable, though a larger vertical window size VSize requires more line memory for processing in a real time video system. FIG. 3 shows an example rectangular window 300 of pixels 301, the widow 300 having a horizontal size HSize larger than the vertical size VSize (e.g., VSize=5, HSize=13). FIG. 3 diagramatically illustrates an example directional segmentation method utilized in the segmentation unit 102 (FIG. 1) which, for a selected pixel of interest 302, checks the luminance of pixels 304 in eight different directions (i.e., doubled headed arrows 306 in horizontal, vertical and diagonal directions), starting from the center pixel (i.e., the selected pixel 302).

In the example of FIG. 3, on the one hand, more pixels are contained in the local window 300 than in FIG. 2 because of the larger horizontal size in FIG. 3, but on the other hand, the line memory usage is reduced because of the small vertical size in FIG. 3 compared to FIG. 2. For the cases where the local neighborhood window is not square, neighboring pixels of center pixel are still checked along eight different directions 304, wherein pixels in the horizontal and vertical directions are checked as before, however pixels diagonal directions are checked by turning to horizontal direction after reaching the vertical limit of the local window 300. The diagonal direction contains the same number of pixels as in the horizontal direction, while the vertical direction contains fewer pixels.

FIG. 4A shows an example VSize=9 by HSize=9 square local neighborhood 400 of pixels 401 around a center pixel 402, FIG. 4B shows the segmentation result 420 for the pixels 401 in FIG. 4A wherein the segmentation result pixels 403 are shown heavily bordered in FIG. 4B. The result segment 420 is based on a pre-defined quantization level using the aforementioned eight-directional segmentation method along directions 406, without considering the symmetry constraint.

Figure 5:
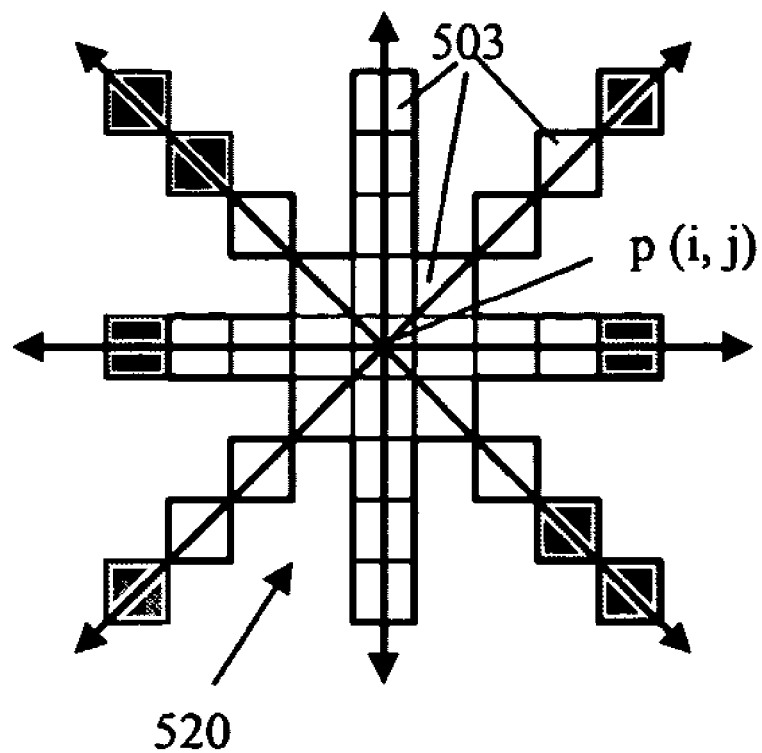
FIG. 5 shows an example of segmentation result after considering symmetry, according to an embodiment of the present invention.

According to one embodiment of the present invention, it is assumed that the segment contains a smoothly changing area in the image, wherein the low-pass filter 104 (FIG. 1) is used to obtain a higher precision luminance value for a selected center pixel based on the luminance values of the pixels in the segment. However, if the segment is not symmetric about the center pixel, the spatial symmetrically designed low-pass filter may yield a biased result. To avoid the bias, the segmentation result is further adjusted to make the segment symmetric about the center pixel. Let the center pixel be p(i, j) at location index (i, j) in the segment (wherein i=1, ..., HSize, and j=1, ..., VSize), then each pixel p(k, l) in the segment is checked, such that if p(2i-k, 2j-l) does not belong to the segment, then pixel p(k, l) is removed from the segment as well (a segment is the result containing only part of the local neighboring pixels). After removing all the pixels whose corresponding pixel on the other side of the center pixel is not within the segment, an updated segment is obtained which is symmetric about the center pixel. This means that every pixel pair p(k, l) and p(2i-k, 2j-l) will be together, either in, or out of, the segment. FIG. 5 illustrates a diagrammatical example of the above steps by showing update segment 420 of FIG. 4B into segmentation result 520 in FIG. 5, wherein the segment 520 includes the heavily bordered pixels 503. FIG. 5 shows an updated segmentation result of that shown in FIG. 4B, after considering the symmetry constraint. The segmentation result 520 is now symmetric about the center pixel p(i, j) in each direction. FIG. 4B is a segmentation result 420 with all the pixels 403 in the segment having a lighter color than other pixels, while in FIG. 5, the segment result 520 is modified to make it symmetric about the center pixel p(i, j), wherein the resulting segment 520 included light colored pixels 503.

After the update, the eight-directional segmentation provides four values which define the extents of each direction (only four values, as each direction has the same extent as its opposite direction).

After the segmentation steps described above, a symmetric segment centered at the pixel of interest is obtained. This segment of pixels is assumed to represent a smoothly changing area and therefore can be used to compute a higher precision value of the center pixel. In an example embodiment of the present invention, low-pass filtering is applied by the filter 104 (FIG. 1) only to the luminance values of the pixels in the segment. As those skilled in the art recognize, other filtering techniques can be utilized, and filtering can be applied to other characteristics of the pixel in place of or in addition to luminance values, according to the present invention. For example, other low-pass filters such as e.g. Gaussian filters with different variances can be utilized.

The filtering parameters can be arbitrary: one simple example involves averaging of the pixels' luminance values (i.e., Y_in for each pixel) within the segment to generate the output luminance value of the high precision pixel as follows:

$$Y\_out = \frac{1}{n}\sum_{i=1}^{n} Y\_in,$$

where n is the number of pixels in the segment and Y_in is the luminance value of those pixels.

In order to obtain average luminance value of the segment, the segment is scanned pixel by pixel from the center pixel towards eight different directions and the luminance values are summed up while the pixel number is counted. The average value is then calculated as the result of dividing the summation by the pixel count. In this process, the maximum and minimum luminance values of the pixels in the segment are recorded for use by the gain computation unit 106 (FIG. 1).

As discussed, several measurements are utilized in the gain computation unit 106 (FIG. 1) to derive a gain value that is used by the adjustment unit 108 to generate the output value Y_out based on the original input value Y_in and the low-pass filtering result. In an example embodiment of the present invention, each measurement leads to a sub-gain, with values between 0 and 1. All the sub-gains are multiplied together to achieve a total gain, which is then spatially filtered to obtain a final gain in the gain computation unit 106, which is then used by the adjustment unit 108 to adjust the output value. The gain computation unit 106 performs the following measurements.

The first measurement is the minimum of the above-mentioned four directional extents of the symmetric segmentation result. In an image where the quantization artifacts are perceivable, the local smoothly changing area is expected to be large. Therefore, a threshold is selected for the minimum of the four extents, wherein if an extent value is smaller than or equal to the threshold, the sub-gain is set to be 0, otherwise the sub-gain is set to be 1.

Figure 6:
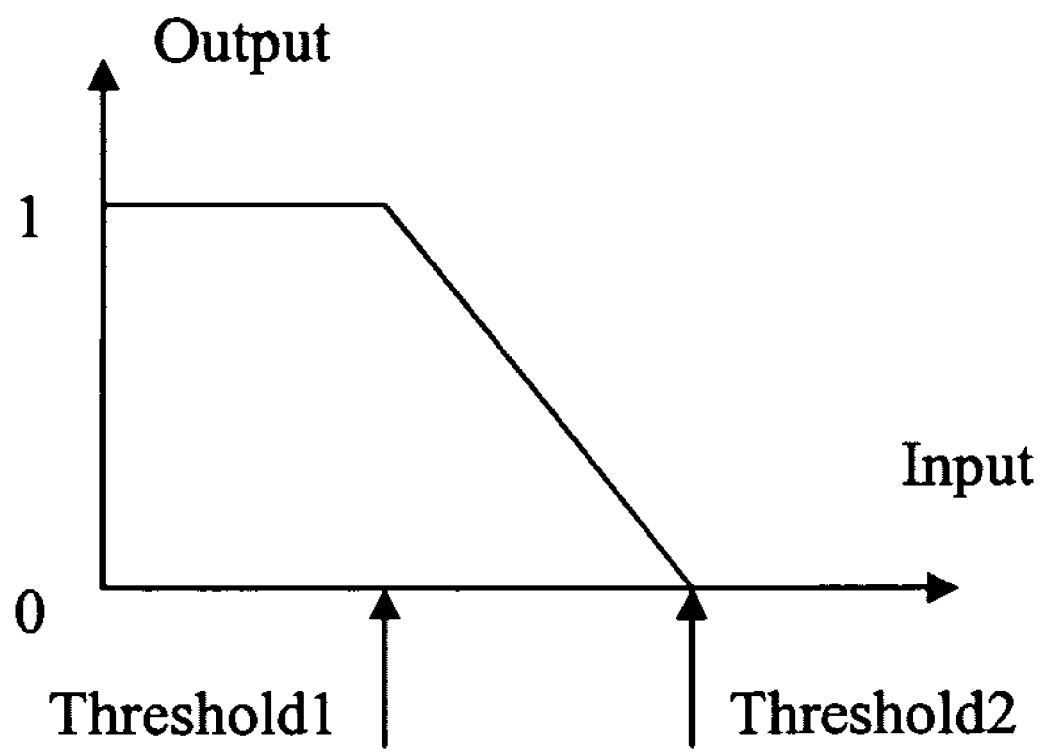
FIG. 6 shows an example soft switching function based on two thresholds, according to an embodiment of the present invention.

The second measurement is the total number sign changes of the difference of the luminance values between neighboring pixels along the four directions and their opposite directions (i.e., eight segmentation directions). A sign change is defined as an instance of minimizing or maximizing value of the pixel luminance values along a direction (i.e., the change of the sign of the first order derivatives, like + to − and − to +). In order to take into account the presence of noise, the luminance values of the pixels are thresholded with a threshold, wherein in one example the average of the maximum and minimum luminance values are utilized as the threshold. After thresholding, each pixel of the segment will either have a value 0 or a value 1. A sign change is counted if that value goes from 0 to 1 and back to 0, or goes from 1 to 0 and back to 1, along each direction. The count is started from the end of one direction to the end of its opposite direction, and the four sign change counts are added in four different directions to generate a total sign change number. The total sign change number is then soft switched to obtain a second sub-gain: two sign change thresholds (i.e., Threshold1 and Threshold2) are pre-defined, wherein if the sign change number is smaller than the smaller sign change threshold Threshold1, then the sub-gain is set to 1; otherwise, if the sign change number is larger than the larger sign change threshold Threshold2, the sub-gain is set to be 0; otherwise, the sub-gain is set to a linearly interpolated value between 0 and 1 based on the position of the sign change number between the two thresholds. FIG. 6 shows an example soft-switching function 600 with the input value (i.e., sign change number) thresholded by two thresholds Threshold1 and Threshold2. The output value is 1 if the input is smaller than Threshold1, and 0 if the input value is bigger than the Threshold2, wherein with the input value between the Threshold1 and Theshold2, the output is linearly interpolated between 1 and 0 as shown.

The third measurement is the noise level estimated for the whole image. The noise level value goes through the same soft switching function as shown in FIG. 6, with two different pre-defined threshold values.

The fourth measurement is the difference between the maximum luminance value and the minimum luminance value of the pixels within the symmetric segmentation result (e.g., FIG. 5). This difference value also goes through a soft switching function as shown in FIG. 6, with different pre-defined threshold values. In one example, the first pre-defined threshold value is defined as the quantization level.

The above four sub-gain (measurement) values are multiplied together to obtain a total gain, which is then processed through a spatial filter to obtain a final gain value in the gain computation unit 106 (FIG. 1). In one example, a 1×3 median spatial filter is used, while in another example, a 3×3 mean spatial filter is used. Different types of spatial filters can be added here in order to ensure the smooth transition of the total gain output G in the gain computation unit 106.

Figure 7:
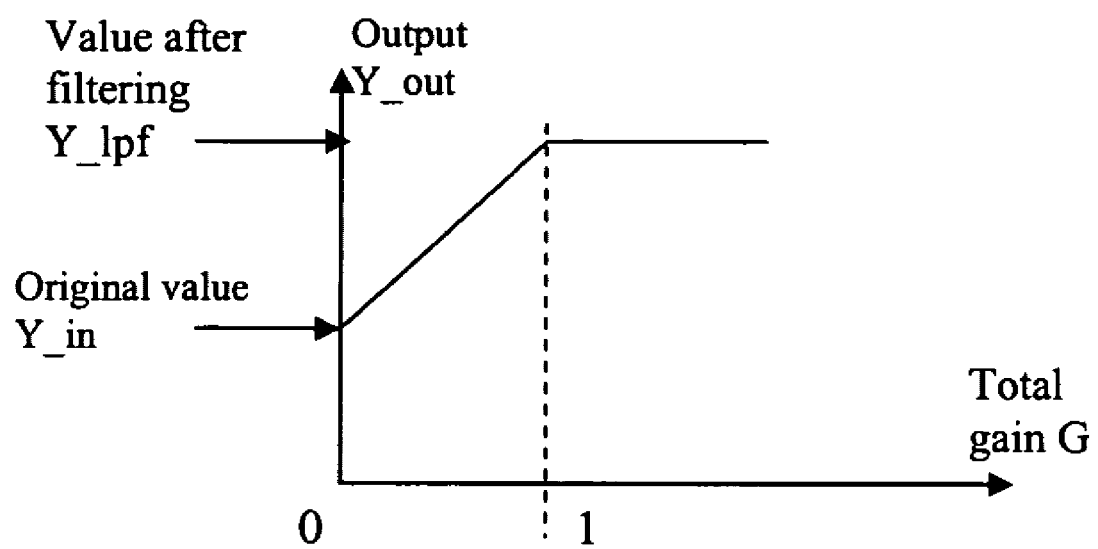
FIG. 7 shows an example of interpolation between the original luminance value and the luminance value after low-pass filtering, according to an embodiment of the present invention.

After the total gain G is computed, the luminance value after low-pass filtering (Y_lpf) and the original luminance value (Y_in) of the center pixel are linearly interpolated in the adjusting unit 108 based on the total gain G. The output of the segmentation unit 102 is a re-segmentation result. The resulting luminance value is the output Y_out which has a higher precision value whereby quantization artifacts are removed. The linear interpolation process is illustrated as in FIG. 7, wherein the interpolation function 702 is used for linear interpolation processing of the original luminance value Y_in and the luminance value after low-pass filtering Y_lpf, based on the total gain G, to generate the output Y_out.

Accordingly, an image processing method and system according to the present invention removes quantization artifacts in digital video/images. The local neighborhood of the current pixel is segmented based on a pre-defined quantization level to generate a segment containing the current pixel. Then, the luminance values of the pixels within the segment are low-pass filtered. Several sub-gains are computed based on measurements of the segment, and the sub-gains are multiplied together and filtered to obtain a final gain value. The final gain value is used to linearly interpolate between the original luminance value and the filtered luminance value of the pixel to obtain an output luminance value.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of video processing comprising using a processor to perform the steps of:
   receiving input luminance signals representing pixels in an input digital video image;
   segmenting the luminance signals representing spatial local pixels neighboring a selected pixel in the image, to obtain a segment containing the selected pixel, and applying a symmetric constraint to obtain a segment symmetric about the selected pixel, wherein segmenting includes checking the pixel luminance difference along different directions in the spatial local pixels neighboring the selected pixel, starting from the selected pixel as a center pixel;
   low-pass filtering the luminance signals based on the resulting symmetric segment to obtain filtered signals; and
   generating high precision luminance output value as a function of the filtered signals, whereby quantization artifacts are removed from the input digital video image.

2. The method of claim 1 wherein the step of generating high precision luminance output value further includes the steps of generating the high precision luminance output value as a function of the filtered signals and the input luminance signals.

3. The method of claim 1 wherein the step of low-pass filtering further includes the steps of counting the number of pixels in the segment and calculating the sum of the luminance values of the pixels.

4. The method of claim 1 wherein the step of generating the high precision luminance output value further includes the steps of using a gain value to adjust the filtered signals to obtain the output luminance value which has a precision higher than the input luminance value.

5. The method of claim 4 wherein the step of generating the high precision luminance output value further includes the steps:
   generating an intermediate output value as a function of the filtered signals and the input luminance signals;
   computing a gain value based on measurements of the symmetric segment; and
   adjusting the intermediate output value by linearly interpolating the input luminance signals and the filtered signal luminance based on the gain value.

6. The method of claim 5 wherein the step of computing a gain value based on measurements of the symmetric segment further include the steps of:
   computing sub-gain values based on measurements of the symmetric segment;
   multiplying the sub-gain values to obtain a total gain;
   filtering the total gain in the image to obtain the gain value.

7. The method of claim 6 wherein the steps of computing sub-gain values further include the steps of:
   counting the total number of sign changes in said pixel luminance differences along each of said directions in the symmetric segment; and
   soft-switching the total number of sign changes as one of the sub-gain values.

8. The method of claim 6 wherein the steps of computing the sub-gain values further include the steps of:
   determining extents of each said directions in the symmetric segment;
   thresholding the minimum extent of the directions in the symmetric segment as one of the sub-gain values;
   soft-switching segment noise level values as one of the sub-gain values; and
   soft-switching a difference between the maximum and minimum luminance of the pixels within the symmetric segment as one of the sub-gain values.

9. The method of claim 8 wherein the step of counting the number of sign changes in the different directions further include the steps of:
   thresholding the luminance of the symmetric segment with the average value of said maximum and minimum luminance values within the symmetric segment;
   counting the number of sign changes said pixel luminance differences along said directions; and
   adding up counted sign changes to generate the number of sign changes.

10. The method of claim 6 wherein the step of filtering the total gain further includes the use of applying spatial filtering to the total gain values of the local neighboring pixels.

11. The method of claim 4 wherein the step of generating high precision luminance output value as a function of the filtered signals further includes the steps of using the gain value to linearly interpolate between the input luminance signals and the filtered signals to generate the high precision luminance output value.

12. An image processing system for removing quantization artifacts from a digital input image represented by pixels, comprising:
   a segmentation unit that segments local pixels neighboring a selected pixel based on a pre-defined quantization level, to generate a segment containing the selected pixel, and applies a symmetric constraint to obtain a segment symmetric about the selected pixel, wherein the segmentation unit further checks the pixel luminance difference along different directions in the spatial local pixels neighboring the selected pixel, starting from the selected pixel as a center pixel;

a filter for low-pass filtering the luminance values of the pixels within the segment;

an adjustment unit that generates a high precision output luminance value as a function of the filtered signals, whereby quantization artifacts are removed from the input digital video image.

13. The system of claim 12 wherein the filter further counts the number of pixels in the symmetric segment and calculates the sum of the luminance values of the pixels.

14. The system of claim 12 wherein the adjustment unit further uses a gain value to adjust the filtered signals to obtain the output luminance value which has a precision higher than the input luminance value.

15. The system of claim 14 further comprising a gain computation unit that computes a gain value based on measurements of the symmetric segment, such that to generate the high precision output luminance value, the adjustment unit further generates an intermediate output value as a function of the filtered signals and the input luminance signals, and adjusts the intermediate output value by linearly interpolating the input luminance signals and the filtered signal luminance based on the gain value.

16. The system of claim 14 wherein the gain computation unit computes the gain based on measurements of the segment by further computing sub-gain values based on measurements of the symmetric segment, multiplying the sub-gain values to obtain a total gain, and filtering the total gain in the image to obtain a the gain value.

17. The system of claim 15 wherein the gain computation unit computes the sub-gain values further by counting the total number of sign changes in said pixel luminance differences along each of said directions in the symmetric segment, and soft-switching the total number of sign changes as one of the sub-gain values.

18. The system of claim 15 wherein the gain computation unit computes the sub-gain values further by determining extents of each said directions in the symmetric segment, thresholding the minimum extent of the directions in the symmetric segment as one of the sub-gain values, soft-switching segment noise level values as one of the sub-gain values, and soft-switching a difference between the maximum and minimum luminance of the pixels within the symmetric segment as one of the sub-gain values.

19. The system of claim 17 wherein the gain computation unit counts the number of sign changes in the different directions further by thresholding the luminance of the symmetric segment with the average value of said maximum and minimum luminance values within the symmetric segment, counting the number of sign changes said pixel luminance differences along said directions, and adding up counted sign changes to generate the number of sign changes.

20. The system of claim 16 wherein the gain computation unit filters the total gain by applying spatial filtering to the total gain values of the local neighboring pixels.

21. The system of claim 14 wherein the adjusting unit uses the gain value to linearly interpolate between the input luminance signals and the filtered signals to generate the high precision luminance output value.

* * * * *